(12) United States Patent
Kramer et al.

(10) Patent No.: US 6,786,366 B2
(45) Date of Patent: Sep. 7, 2004

(54) METERING DEVICE FOR DRY BULK MATERIAL

(75) Inventors: Walter Kramer, Kreuzlingen (CH); Holger Kühnau, Constance (DE); Manfred Nowak, Constance (DE); Paul Hodruss, Isny (DE)

(73) Assignee: Motan Holding GmbH, Constance (DE)

( * ) Notice: Subject to any disclaimer, the term of this patent is extended or adjusted under 35 U.S.C. 154(b) by 0 days.

(21) Appl. No.: 10/249,373

(22) Filed: Apr. 3, 2003

(65) Prior Publication Data
US 2003/0189064 A1 Oct. 9, 2003

(51) Int. Cl.$^7$ .............................. B67D 5/06; G01F 11/20
(52) U.S. Cl. .................... 222/411; 222/185.1; 222/226; 222/412
(58) Field of Search ................................. 222/410–414, 222/185.1, 181.1–181.3, 630, 216, 226, 229, 333, 464.1

(56) References Cited

U.S. PATENT DOCUMENTS

| | | | | |
|---|---|---|---|---|
| 279,135 A | * | 6/1883 | Cornford, Jr. | 222/241 |
| 6,039,220 A | * | 3/2000 | Jablonski et al. | 222/236 |
| 6,062,720 A | * | 5/2000 | Ionadi | 366/117 |

* cited by examiner

Primary Examiner—J. Casimer Jacyna
(74) Attorney, Agent, or Firm—Gudrun E. Huckett

(57) ABSTRACT

A metering device for metering dry bulk material contained in a storage container has at least one metering element and a rotary drive connected to the at least one metering element. At least one outlet is provided, and the metering element feeds the dry bulk material to the outlet. The metering element transports the dry bulk material in a direction different from a horizontal direction and comprises at least one helical stay. The outlet has an outlet pipe that extends into the lower area of the storage container. The helical stay interacts with the outlet pipe for effecting transport of the dry bulk material.

19 Claims, 4 Drawing Sheets

METERING DEVICE FOR DRY BULK MATERIAL

BACKGROUND OF INVENTION

1. Field of the Invention

The invention relates to a metering device for dry bulk material comprising at least one metering element driven by a rotary drive for feeding the bulk material from a storage container to at least one outlet.

2. Description of the Related Art

Metering devices in the form of metering screws, metering transfer canals, or metering disks for dry bulk material are known. They have the disadvantage that they do not have absolutely linear metering properties. The metering transfer canal exhibits always pulsation as a result of the individual metering chambers. A metering disk also has a pulsing action because of its metering holes. The metering screw pulses according to a sine curve because of the drop of the dry bulk material at the exit of the screw. When positioning the metering screw at a slant, the sine-shaped pulsation during removal of the metered dry bulk material can be reduced but not prevented.

In particular in discontinuously operating mixing devices, the irregular metering quantities have the disadvantage that, depending on the type of metering device, the concentration (proportion in percentage) of the individual components can exhibit short-term deviations as a result of pulsation. In connection with so-called batch mixing systems, the irregular metering action has the also the disadvantage that a defined weight or volume of dry bulk material cannot be metered with high precision. The imprecision of such systems results from the fact that, upon stopping the metering device, a chamber or a screw winding will not empty at all or will empty too much. The irregular metering quantities are particularly disadvantageous when small or even smallest quantities must be metered.

SUMMARY OF INVENTION

It is an object of the present invention to configure the metering device of the aforementioned kind such that a uniform and precise metered flow is ensured.

In accordance with the present invention, this is achieved in that the metering element transports the dry bulk material in a direction deviating from the horizontal direction and comprises at least one helical stay which during transport of the dry bulk material interacts with a pipe projecting into the lower area of the storage container.

In the metering device according to the invention, the material to be metered is engaged by the helical stay and is uniformly fed to the outlet. Advantageously, the metering element extends vertically. The material is then transported by the helical stay in the upward direction. By means of the metering device according to the invention, even smallest amounts of material can be metered with high precision. Fluctuations in the metering action do not occur as a result of the embodiment according to the invention.

DETAILED DESCRIPTION

Figure 1:
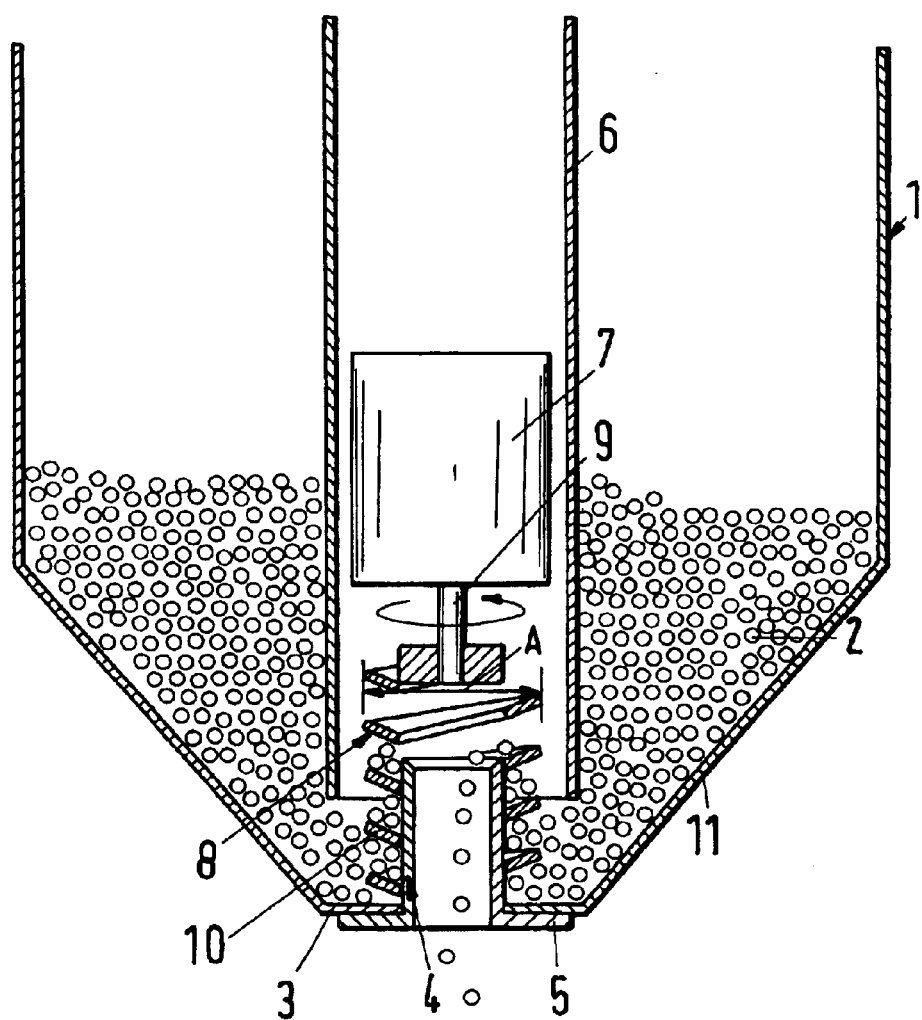
FIG. 1 is an axial section of a first embodiment of the metering device according to the invention.

The metering device serves for metering dry bulk material with high precision. The metering device according to FIG. 1 has a storage container 1 for bulk material 2 to be metered. The storage container 1 tapers at the lower end in a cone shape and has a bottom 3 through which an outlet pipe 4 projects into the storage container 1. The outlet pipe 4 has a lower end that is provided with a radially outwardly extending flange 5 which rests against the underside of the bottom 3 of the storage container 1 and is fixedly connected to the bottom 3.

The outlet pipe 4 projects into the lower end of an inner pipe 6 which advantageously has a circular inner cross-section and is arranged centrally within the storage container 1. The inner pipe 6 ends at a spacing from the bottom 3 of the storage container 1. A drive 7 is provided In the inner pipe 6 and drives a metering element 8 in rotation.

The metering element 8 is formed as a coil or helix which extends approximately from the bottom 3 of the storage container 1 upwardly into the inner pipe 6. Here, the metering element 8 is connected fixedly to the drive shaft 9 of the drive 7. The metering element 8 surrounds with a portion of its height the outlet pipe 4.

The metering element 8 has a helical stay 10 which is positioned at an acute angle relative to the axis of the outlet pipe 4 and the axis of the inner pipe 6. The stay 10 approaches the outer peripheral surface of the outlet pipe 4 so closely that the bulk material transported by the metering element 8 cannot enter the space between the stay 10 and the peripheral surface of the outlet pipe 4.

The working diameter A of the metering element 8 and the inner diameter of the inner pipe 6 are adjusted to one another such that the bulk material particles cannot be jammed between the stay 10 of the metering element 8 and the inner wall of the inner pipe 6. It is even possible, as illustrated in FIG. 1 in an exemplary fashion, to provide a sufficiently large spacing between the metering element 8 and the inner wall of the inner pipe 6.

The bulk material 2 is introduced into the storage container 1. The dry bulk material 2 slides downwardly onto the bottom 3 along the conically tapering end 11 of the storage container 1. Here, the dry bulk material 2 is engaged by the rotatably driven metering element 8. The metering element 8 is rotated about its axis such that the dry bulk material on the stay 10 moves along the outer wall of the outlet pipe 4 upwardly until it reaches the upper end of the pipe 4. Here, the dry bulk material drops into the outlet pipe 4 in which it falls downwardly to further processing stations. The dry bulk material flows in the area underneath the inner pipe 6 into the area of the rotating metering element 8 which is filled in accordance with-the repose angle of the bulk material 2 to be metered. By means of the metering element 8, a uniform dry bulk material flow is transported upwardly. This dry bulk material flow drops downwardly in uniform flow about the circumference of the outlet outlet pipe 4.

By means of the helical metering element 8, a uniform metering flow is transported upwardly with minimal force expenditure. A contributing factor is that the inner pipe 6 surrounds the metering element 8 at a distinct spacing so that the inner pipe 6 exerts no resistance on the transported bulk material 2 during its transport by the metering element. In this way, a uniform, linear, and precise metering flow can be generated. The described metering device is thus excellently suitable in so-called batch mixing systems because a defined weight or a defined volume of the bulk material can be metered with very high precision. Accordingly, the metering device is also excellently suitable for metering smallest quantities.

During transport of the dry bulk material 2 by means of the metering element 8, the dry bulk material particles are transported continuously in the upward direction in the area between the stay windings about the entire circumference of the outlet pipe 4. Since the stay 10 extends at a slant downwardly in a direction toward the axis of the outlet pipe 4, the dry bulk material during its transport along the outlet pipe 4 is entrained reliably by the helical stay 10 of the metering element 8.

Figure 2:
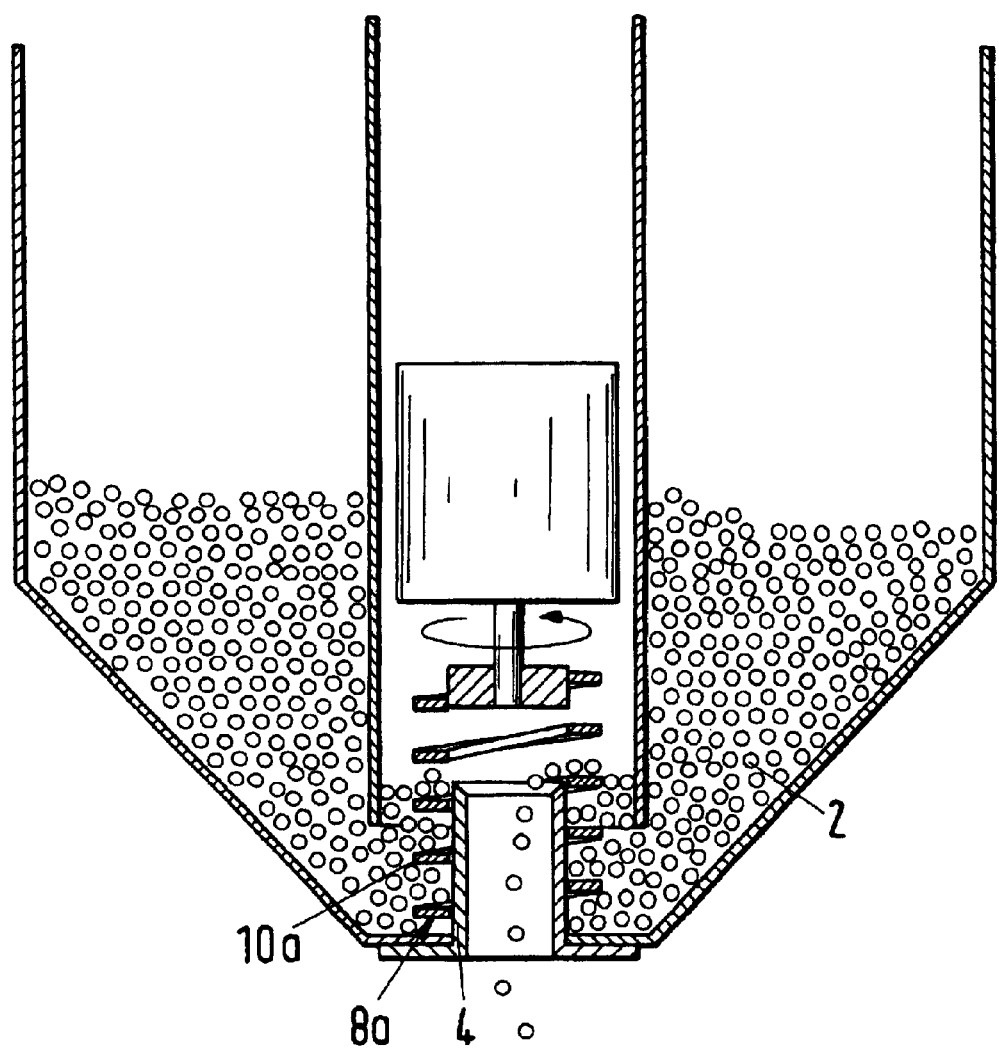
FIG. 2 shows a second embodiment of the metering device according to the invention in a representation corresponding to FIG. 1.

In the embodiment according to FIG. 2, the metering element 8a has a horizontally arranged helical stay 10a. In other respects, this metering device 8a according to FIG. 2 is embodied identical to the embodiment of FIG. 1. On the stay 10a extending perpendicularly to the axis of the outlet pipe 4, the bulk material 2 is transported upwardly along the outer circumference of the outlet pipe 4 until it drops into the outlet pipe 4.

Figure 3:
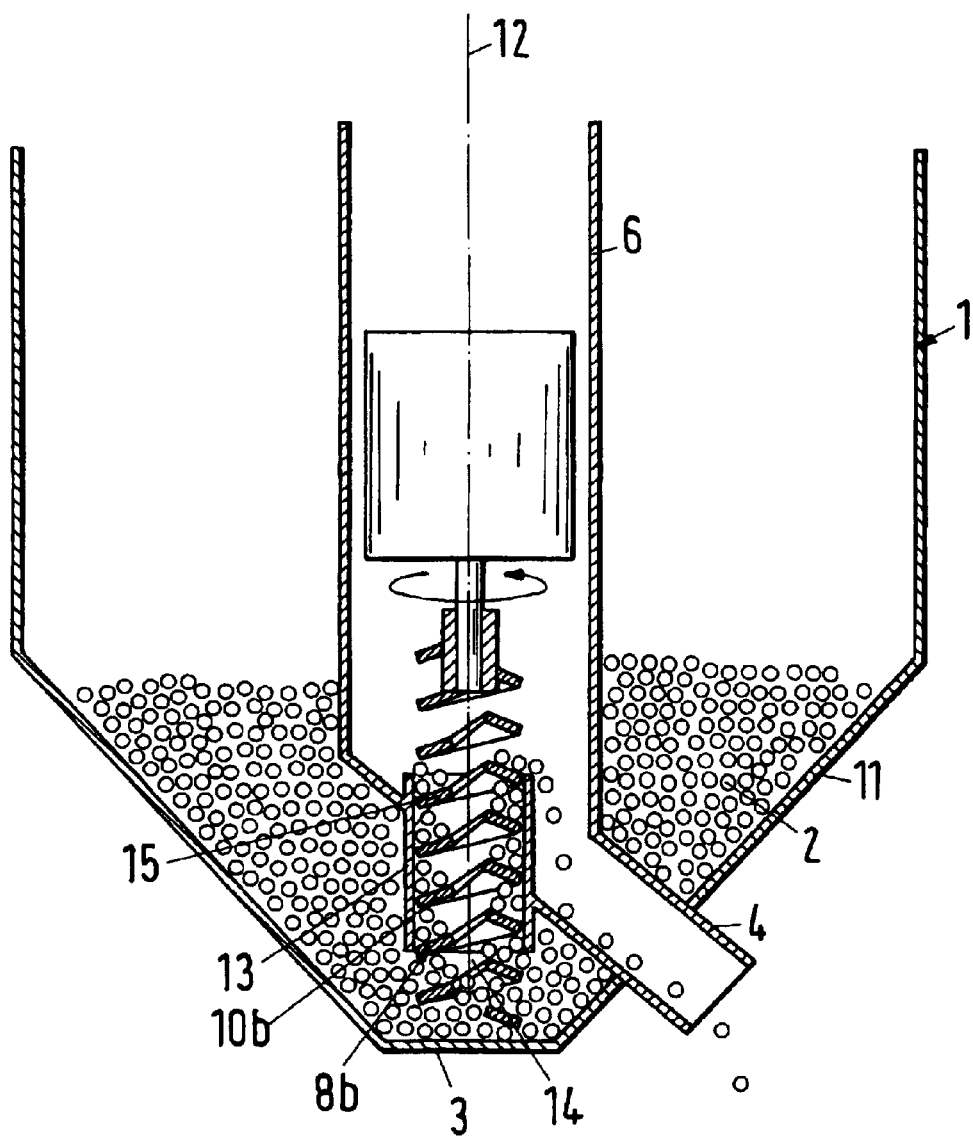
FIG. 3 is an illustration corresponding to FIG. 1 of a third embodiment of the metering device according to the invention.

The metering device according to FIG. 3 has an inner pipe 6 which at its lower end passes into the outlet pipe 4. The outlet pipe 4 projects seal-tightly through the wall of the cone-shaped end 11 of the storage container 1. The bottom 3 of the storage container 1, in contrast to the preceding embodiments, is closed. The outlet pipe 4 extends at an obtuse angle relative to the axis 12 of the inner pipe 6. A pipe member 13 projects into the slantedly extending outlet pipe 4 whose axis 14 is aligned with the axis 12 of the inner pipe 6. The pipe member 13 projects seal-tightly through the outlet pipe 4, is spaced from the bottom 3, and is fixedly connected to the bottom 3. The metering element 8b extends through this pipe member 13 and has a helical stay 10b that, in contrast to the embodiment of FIG. 1, is positioned at an obtuse angle relative to the axis 12 of the inner pipe 6. In this way, the stay 10b is positioned at a slant outwardly and downwardly. The stay 10b meets or extends up to the inner wall 15 of the pipe member 13. In this way, the pipe member 13 assists the transport of the dry bulk material 2 on the stay 10b of the metering element 8b.

In accordance with the two preceding embodiments, the stay 8b extends to a location near the bottom 3 of the storage container 1. In this way, it is ensured that the dry bulk material 2 within the storage container 1 is reliably engaged and transported upwardly by means of the helical stay 10b. As soon as the upper end of the pipe member 13 is reached, the dry bulk material falls along the circumference of the pipe member 13 downwardly into the slantedly positioned outlet pipe 4.

In the embodiment according to FIG. 3, the stay can also be positioned, corresponding to the embodiment of FIG. 2, perpendicularly to the axis 12 of the inner pipe 6. Since the stay is helical, in this case the dry bulk material 2 is also transported upwardly within the pipe member 13.

Figure 4:
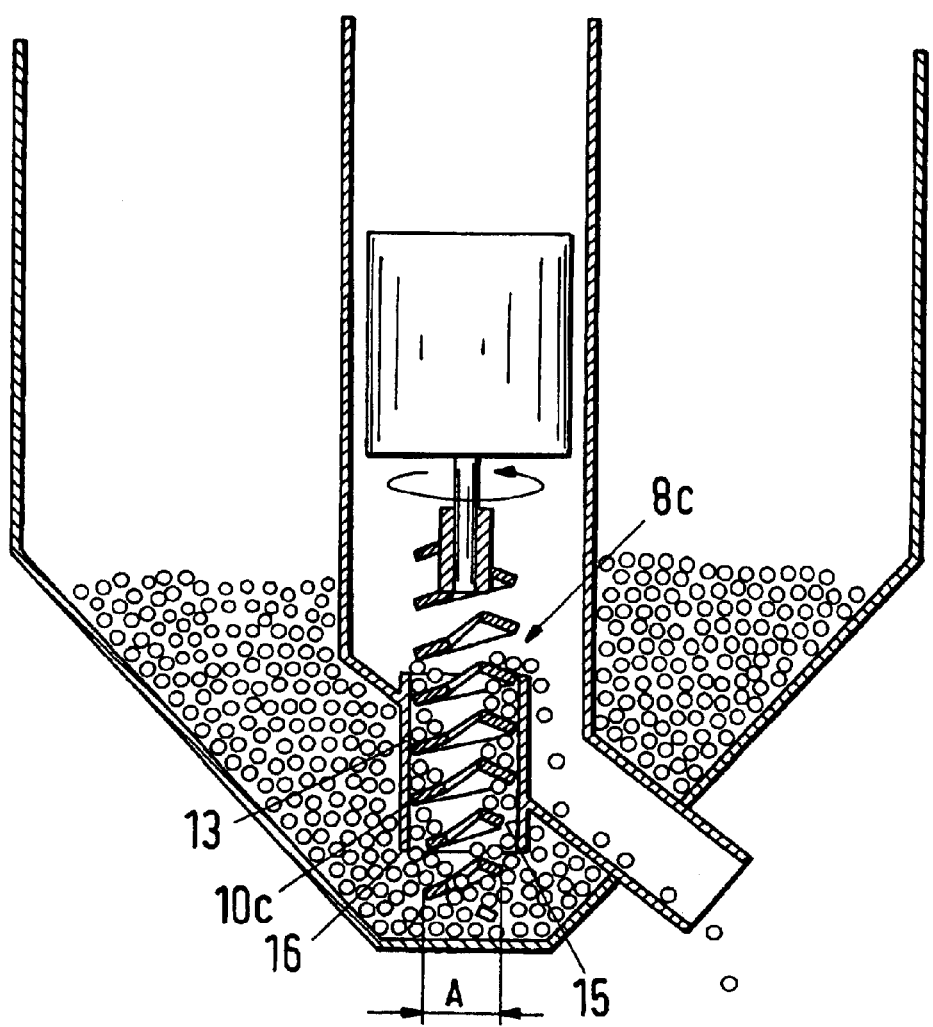
FIG. 4 is an illustration corresponding to FIG. 1 of a fourth embodiment of the metering device according to the invention.

In the preceding embodiments, the helix of the metering element has a constant working diameter A across its length. In the embodiment according to FIG. 4, the working diameter A of the metering element 8c is smaller at the level of the lower end 16 of the pipe member 13 than in the other areas. In this way, the diameter of the stay 10c in this area is smaller than the inner diameter of the pipe member 13 so that there is no risk in regard to the dry bulk material particles becoming jammed between the pipe member 13 and the stay 10c when entering the pipe member 13. At a short distance above the lower pipe member 16, the stay 10c extends to the inner wall 15 of the pipe member 13 so that the dry bulk material can be reliably transported in the upward direction. In other respects, the metering device is identical to the embodiment of FIG. 3.

In the embodiments of FIGS. 1 and 2, it is possible to connect the metering element fixedly to the outlet pipe. In this case, the outlet pipe rotates together with the metering element.

In another embodiment (not illustrated), the metering element is fastened on the inner wall of the inner pipe 6. In this case, the inner pipe 6 extends to the bottom 3 of the storage container 1. The helical stay extends to the periphery of the outlet pipe. In this case, by means of the drive 7, the inner pipe 6 is driven in rotation about its axis 12 so that the metering element can also be rotated accordingly. The dry bulk material, as explained with the aid of FIGS. 1 through 4, is transported by means of the helical stay upwardly to such an extent until the dry bulk material can fall into the outlet pipe.

While specific embodiments of the invention have been shown and described in detail to illustrate the inventive principles, it will be understood that the invention may be embodied otherwise without departing from such principles.

What is claimed is:

1. A metering device for metering dry bulk material contained in a storage container, the metering device comprising:
   at least one metering element;
   a rotary drive connected to the at least one metering element;
   at least one outlet, wherein the at least one metering element feeds the dry bulk material to the at least one outlet;
   wherein the at least one metering element transports the dry bulk material in a direction different from a horizontal direction and comprises at least one helical stay;
   wherein the at least one outlet has an outlet pipe adapted to extend into a lower area of the storage container;
   wherein the at least one helical stay interacts with the outlet pipe for effecting transport of the dry bulk material.

2. The metering device according to claim 1, wherein the at least one stay is positioned at a slant to an axis of the pipe.

3. The metering device according to claim 2, wherein the at least one stay is slanted inwardly and downwardly relative to the axis of the outlet pipe.

4. The metering device according to claim 2, wherein the at least one stay is slanted outwardly and downwardly relative to the axis of the outlet pipe.

5. The metering device according to claim 1, wherein the at least one stay is arranged perpendicularly to the axis of the outlet pipe.

6. The metering device according to claim 1, wherein the at least one stay surrounds the outlet pipe.

7. The metering device according to claim 1, wherein the at least one stay is arranged at least over a portion of a length of the at least one stay in the outlet pipe.

8. The metering device according to claim 1, further comprising an inner pipe adapted to be arranged within the storage container, wherein the outlet pipe projects into the inner pipe.

9. The metering device according to claim 8, wherein the axis of the outlet pipe is aligned with an axis of the inner pipe.

10. The metering device according to claim 8, wherein the inner pipe is arranged centrally in the storage container.

11. The metering device according to claim 8, wherein the inner pipe ends at a spacing from a bottom of the storage container.

12. The metering device according to claim 8, wherein the rotary drive for the metering element is arranged in the inner pipe.

13. The metering device according to claim 8, wherein the dry bulk material transported by the at least one metering element drops into the outlet pipe.

14. The metering device according to claim 8, wherein the outlet pipe is positioned at a slant to the axis of the inner pipe.

15. The metering device according to claim 14, wherein the inner pipe has a lower end forming the outlet pipe.

16. The metering device according to claim 1, wherein the at least one metering element is fixedly connected to the outlet pipe and the outlet pipe rotates together with the metering element.

17. The metering device according to claim 1, wherein the at least one metering element has a constant working diameter over a height of the at least one metering element.

18. The metering device according to claim 1, wherein the at least one stay has a constant working diameter over a height of the at least one stay.

19. The metering device according to claim 1, wherein the at least one metering element has a working diameter at a level of a lower edge of the outlet pipe which working diameter is smaller than an inner diameter of the outlet pipe.

* * * * *

UNITED STATES PATENT AND TRADEMARK OFFICE
CERTIFICATE OF CORRECTION

PATENT NO. : 6,786,366 B2
DATED : September 7, 2004
INVENTOR(S) : Walter Kramer et al.

It is certified that error appears in the above-identified patent and that said Letters Patent is hereby corrected as shown below:

<u>Title page,</u>
Insert Item:
-- [30]  Foreign Application Priority Data
April 5, 2002    (DE)            102 15 529.1 --

Signed and Sealed this

Twenty-second Day of March, 2005

JON W. DUDAS
*Director of the United States Patent and Trademark Office*